United States Patent [19]

Rubenstein et al.

[11] 4,390,553

[45] Jun. 28, 1983

[54] EDIBLE FOOD CONTAINERS AND THE METHOD OF COATING SAID CONTAINERS

[75] Inventors: Irving H. Rubenstein; Herbert M. Bank, both of Owings Mills, Md.

[73] Assignee: Maryland Cup Corporation, Owings Mills, Md.

[21] Appl. No.: 263,094

[22] Filed: May 12, 1981

Related U.S. Application Data

[63] Continuation-in-part of Ser. No. 175,374, Aug. 5, 1980.

[51] Int. Cl.³ .................. A23L 1/10; A23G 3/20; A21D 15/08
[52] U.S. Cl. .................. 426/138; 426/139; 426/306; 426/307; 426/94; 426/95
[58] Field of Search ............... 426/101, 138, 139, 306, 426/307, 94.95

[56] References Cited

U.S. PATENT DOCUMENTS

| | | | |
|---|---|---|---|
| 1,559,412 | 10/1925 | Franzen | 426/306 |
| 1,615,680 | 1/1927 | Buhse | 426/139 |
| 2,925,347 | 2/1960 | Cummings et al. | 426/307 |
| 3,171,367 | 3/1965 | Carter et al. | 426/307 |
| 3,366,486 | 1/1968 | Weinstein et al. | 426/138 |
| 3,410,691 | 11/1968 | Stanley | 426/138 |
| 3,524,759 | 8/1970 | McConnell et al. | 426/307 |
| 3,526,515 | 9/1970 | Werbin | 426/307 |
| 3,632,356 | 1/1972 | Silverstein | 426/306 |
| 3,679,429 | 7/1972 | Mohrman et al. | 426/307 |
| 3,798,338 | 3/1974 | Galle | 426/307 |
| 4,032,667 | 6/1977 | Krueter | 426/307 |

FOREIGN PATENT DOCUMENTS 947672  1/1964  United Kingdom ............... 426/306

Primary Examiner—Jeanette M. Hunter
Attorney, Agent, or Firm—Birch, Stewart, Kolasch & Birch

[57] ABSTRACT

A method of coating an edible food container by applying a moisture-resistant fat coating to the interior of the container by introducing the coating into the container and forcing the coating up the inside surface by rapidly rotating the container and/or coating. The resulting container has a more uniform and continuous film coating.

13 Claims, 3 Drawing Figures

EDIBLE FOOD CONTAINERS AND THE METHOD OF COATING SAID CONTAINERS

BACKGROUND AND SUMMARY OF THE INVENTION

The present application is a continuation-in-part of U.S. patent application Ser. No. 175,374 filed Aug. 5, 1980.

The present invention relates to edible food containers containing a moisture-proof, food grade, barrier coating and to a method of applying said barrier coating to at least one surface of an edible food container. More particularly, the present invention is directed to the application of food grade fats to edible food containers.

Edible food containers are containers which are used to handle and dispense a number of different kinds of food items, for example dessert type food products such as ice cream, custards, etc., and the non-dessert type food products such as Chinese food, Mexican food, and the like. Such containers are desirable because they can be consumed simultaneously with or after the consumption of the food product itself.

It is a common practice to utilize edible food containers such as ice cream cones to dispense frozen or semi-frozen ice cream products. Such cones can be manufactured by two basic methods.

One of the methods is concerned with the manufacture of molded cones which involves depositing a semi-fluid batter consisting of such ingredients as water, flour, sugar, shortening, leavening, lecithin and flavor into a mold. After the batter is disposed in the mold, a core is inserted into the mold so that the batter is forced to assume the shape of the space provided between the core and the mold. As a result, it is possible to mold cones of a conical shape or cups of various sizes and configurations. Once the core of the mold is joined with the batter, the molds are subjected to heat for an appropriate length of time, at which point the cores are removed, the molds are broken open and the cones are discharged onto a conveyor for possible trimming and for packing.

The second method for the manufacture of ice cream cones is based on the principle of baking a flat waffle between two plates to make the so-called sugar roll cone. The resulting product which is a flat sheet with an inscribed surface on the top thereof, is picked up mechanically and transferred to a piece of equipment that rolls the flat waffle into the conical shape we recognize as an ice cream cone. The phenomenon that permits this rolling process is the transformation, during the baking process, of crystalline sugar into its fluid state, since during the baking operation, the waffle reaches a temperature in excess of 300° F. To bake such a cone requires a concentration of sugar of from 20–50% or even higher, based on the weight of the flour, to provide the plasticity for the hot waffle to be rolled to the necessary shape. However, there is a problem with the pliability of the waffle, for if the waffle is too soft it is very difficult to pick up mechanically and roll. Also, once the cone has been rolled, it must not lose its shape and become "out of round" when it is dropped onto a conveyor while it is still hot and the sugar has not yet had a sufficient time to crystallize. Making a good cone is both the function of the temperature of the cone as it is discharged from the rolling mechanism and the amount of sugar in the formula. Some ovens permit, and even need, higher sugar levels than others so that the physical limitations of the oven often dictate the formula that can be used. The above mentioned factors are characteristic of industry practices.

When it is desired to add flavor and moisture resistance to cones, the cones are often put through chocolate enrobers wherein either pure chocolate coating containing cocoa butter or a compound coating which is a mixture of cocoa and vegetable fats is applied to the cone to enclose the cone in a flavored fat-base material. The problem with this technique is that great care must be exercised in the handling and shipping of cones during warm weather, for obviously the coating will melt during extreme shipping temperatures which can reach as high as 140° F. in a railroad boxcar. If a fat or a higher melting point material is used to compensate for this problem, it has been found that the eating qualities of the finished cone are adversely affected inasmuch as the high melting point fats have an unpleasant, waxy feel to the mouth.

Since many of the cones manufactured by the methods discussed above have a bland taste, as a result of a low sugar content, they are equally adaptable or can be readily adaptable for use with unsweetened, non-dessert type food products such as Chinese food, Mexican food and other related food products. However, irrespective of the type of food product which is used in conjunction with the edible food container, it is important that such containers not only possess good strength but also contain a resistance to moisture penetration by liquids which are present in both frozen and nonfrozen food products. Thus, for example, after ice cream cones, either molded or rolled are baked, there are intrinsic problems in handling, shipping and finally serving the cones. Ice cream cones are, by their very nature, fragile containers, so that great care must be taken to pack these products in materials which will protect them against breakage as they travel from the bakery to the warehouses and ultimately to the user. When the cones arrive at their destination they must be strong enough to accept the pressure of a dipped ball of frozen food product, for example, ice cream, when it is placed on the top of the cone. An operator dispensing ice cream must, of necessity, be sure that the ice cream sufficiently adheres to the cone. Thus, a degree of pressure is necessary to force the ball of ice cream onto the rim of the cone. Either because of a lack of skill of the operator or the inherent weakness of the cone there is the constant problem of the cone breaking in the process. As a result, it has long been an objective of the ice cream cone manufacturers to find a method of increasing the strength of the cone.

Sugar roll cones and to some extent molded cones are frequently used for prepacking ice cream rather than for handling ice cream at the point of service. When ice cream cones are prepacked and the combined ice cream and cone are stored in a freezer, the cone tends to absorb moisture from the ice cream. In addition, any snow or condensation that has deposited on the outside of the cone during storage melts upon exposure to ambient temperatures which further contributes to a soggy cone. Ice cream, as it is extruded from a freezer in the form of soft ice cream at a temperature of from 19° to 26° F. contains only about 30% of its water in the form of ice, while the remaining portion of the water is simply trapped in the matrix of the ice cream. The freezing of most of the remaining water in a storage area can take anywhere from one hour to forty-eight hours, depending on whether the ice cream factory has a fast freeze tunnel or relies on normal freezer temperatures of anywhere from −40° to −10° F. to accomplish this purpose. Because of this time lag in freezing the ice cream, the free water is often absorbed by the cone causing a soggy mass since there is no liquid or water barrier which exists between the cone and the ice cream. Mechanisms have been developed to spray cones which chocolate coating just prior to the dispensing of the ice cream into the cone from a filling machine. Unfortunately, spraying has been found to deposit a multiple series of droplets on the inside surface of the cone so there is the possibility of uncoating the surfaces between the particles of chocolate coating. These uncoated surface areas provided a "pathway" for moisture to penetrate the cone and eventually render soggy the baked portion disposed behind the coating.

Similar problems are experienced when non-dessert type food products such as Chinese food, Mexican food and the like are placed in cone-type edible food containers. The liquid portion of the food product is readily absorbed by the container causing the container to become soggy and difficult to handle. Thus, it is necessary to provide edible food containers with sufficient strength to resist breaking during manufacture, shipment, handling and use and also to provide containers with a resistance to moisture penetration by the food product which is introduced into the food container.

Accordingly, an object of the present invention is to provide a method for coating edible food containers to provide them with increased moisture resistance.

Another object of the present invention is to provide edible food containers which possess improved resistance to liquid absorption, and as such are effective in holding and dispensing a variety of both hot and cold food products.

A further object of the present invention is to provide a method for coating an edible food container so that the container possesses increased strength and, as such, substantially reduces damage caused to the containers during manufacture, storage, packing and use.

Still another object of the present invention is to provide edible food containers which can be used to hold and dispense a variety of food products, such as for example, ice cream, jello, pudding, desserts, Chinese food and the like.

A still further object of the present invention is to provide edible food containers which possess a flavor which is compatible with the contents to be dispensed therein.

Yet another object of the present invention is to provide a method for producing edible food containers which contain a barrier coating of substantially uniform thickness disposed on at least one of the surfaces thereof to achieve increased strength, and/or increased moisture resistance, and/or improved flavor.

An additional object of the present invention is to provide an improved method for applying a liquid barrier coating to at least one surface of an edible food container.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-identified disadvantages have been eliminated and the objects of the present invention have been achieved by utilizing a flo coat method and apparatus for applying a uniform coating of an edible, moisture proofing fat material or modified fat material to at least one surface of an edible food container.

As noted hereinabove it was thought that fats could not be used as a barrier coating for edible food containers because the eating quality of the coated container would be adversely effected because of the unpleasant, waxy feel of the fat to the mouth. For example, when spraying containers with a fat material, a plurality of droplets contact the surface of the container, leaving a plurality of spaces disposed between the droplets. Thus in order to cover these spaces it is necessary to again spray the container causing the fat to cover the open spaces. However, this also produces multiple layers of fat on the previously deposited fat droplets. These globs of multiple layers of fat droplets produce an unequal layer of fat material which contributes to the waxy feel which is produced in the mouth. However, these problems are effectively eliminated by utilizing the flo coat method in applying a fat coating to an edible food container. Thus by utilizing a flo coat method in combination with a fat material, a coating of great uniformity can be produced on the edible food container which cannot be achieved by other coating methods. By avoiding the formation of multiple layers of fat material on the surface of the edible food container, the unpleasant taste of excess fat produced by the deposition of multiple layers of fat can be eliminated. By flo coating is meant any method wherein the fat coating is introduced into the container and caused to rotate or swirl, for example, by rotating the container at high speed, whereby the container surface is uniformly coated with a single layer of fat. Examples of this procedure are the flo-coating method of FIGS. 1 to 3 herein and the Flex-E-Fill method.

Enrobers are devices which are known to be effective in coating flat surfaces. However the problems involved in coating edible food containers with corners, rims and crevices where fat could accumulate are completely different from those of flat surfaces. By utilizing the flo coating techniques, a uniform coating can be applied to edible food containers without such an accumulation.

When considering edible food containers for dessert-type food products such as ice cream, jello, pudding, and the like, a barrier coating in the form of a uniform, continuous film is applied to the food container, such as for example, a molded cone or a rolled sugar cone. Advantageously, the barrier coating is applied to the inside surface of the edible food container so as to protect the container from undue moisture contributed by the food product which would otherwise be absorbed by the food container. It can be understood that where additional strength is desired, the outside surface of the food container can also be provided with a barrier coating.

The type of flavors which can be utilized in the barrier coating composition of the present invention depend on the particular food product which is being dispensed by the container. With dessert-type foods the flavors can include the citric acid flavors such as orange, lemon, grapefruit, grape, and the like and non-acid flavors such as, for example, banana, maple, and the like. For non-dessert type food products, a variety of other flavors can be added to the fat material, such as, for example, rye flavor, garlic flavor, onion flavor, etc., depending on the particular food being dispensed.

According to the present invention the barrier coating, for example, a mixture of fat plus a flavor-producing material is applied to an edible food container, for example, a cone, by using the flo-coating technique wherein an appropriate amount of the barrier coating is first deposited in the bottom of the container. The container is then placed in a mechanism which is rotated at a high speed forcing the liquid coating against the inside of the container. Any excess liquid which escapes from the top of the container runs back into a reservoir for reuse. Advantageously, the flo-coating material is heated up to about 220° F., preferably about 160°–220° F., depending upon the particular fat being utilized. After the flo-coating operation is completed, the coated food containers are discharged into either ambient conditions or into a cooling chamber depending on the particular fats being utilized, the packaging conditions and ambient conditions. Thus, for example, subsequent cooling may be desirable when processing under extreme summer time temperature conditions.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
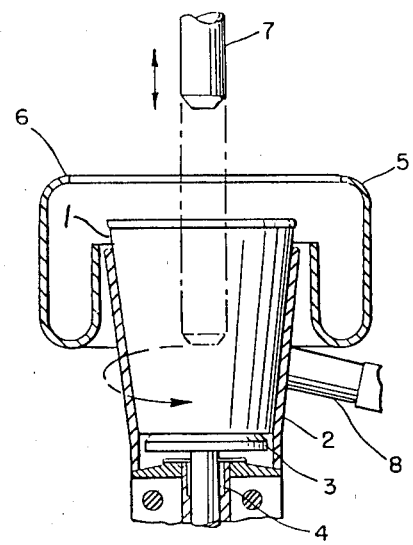
FIG. 1 is a device used for flo-coating an edible food container with a barrier coating composition.
Figure 2:
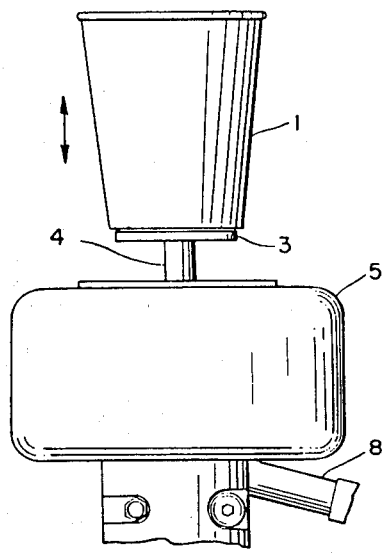
FIG. 2 is the device of FIG. 1 in a different position of operation.
Figure 3:
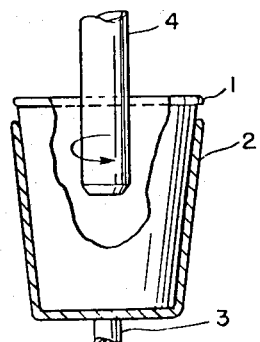
FIG. 3 is an alternative device for achieving the flo-coat method of the present invention.

An apparatus which can be effectively utilized in conducting the flo-coat method of the present invention is shown in FIGS. 1, 2 and 3 of the present application. FIG. 1 shows a food container 1, which in this case is a cone, disposed in a rotatable receptacle 2. The cone is supported by a platform 3 and a vertical post member 4. The platform 3 and the vertical post member 4 are adapted to move in the vertical direction independent of the rotation of the receptacle 2. The upper portion of the receptacle is provided with an overflow reservoir 5 which is adapted to retain excess coating material which is discharged from the food container during the coating operation. The reservoir is provided with an aperture 6 which permits the introduction of a nozzle 7 into the cup for loading the cup with the barrier coating material prior to the flo-coat operation. The reservoir 5 is also provided with a conduit means 8 for recycling the overflow coating material to the nozzle means 7 for reuse.

In operation, and specifically referring to FIG. 1, the food container 1 to be coated is introduced into the receptacle 2. Then the coating material is introduced into the food container through nozzle 7 up to a predetermined level. The receptacle containing the cup is then rotated at a high speed forcing the coating liquid up the inside of the container, and uniformly coating the entire inside surface of the cone. Any excess coating liquid escaping from the top of the cone runs into the reservoir 5 where it is collected and eventually recycled through a conduit 8 back to the feed nozzle 7. After the cone 1 has been uniformly coated on the inside thereof, it is removed from the receptacle tube through the aperture 6 provided in the reservoir 5 by the vertical movement of the platform 3 and the center post member 4 as shown in FIG. 2.

In an alternative embodiment of the apparatus of the present invention, the coating liquid can be forced up the inside of the container by the rotation of a mandril centrally disposed within the food container. Thus, in this embodiment, rather than rotating the receptacle which holds the food container, the coating material can be introduced into the food container and then the mandril can be rotated, thereby achieving the same result. In this latter embodiment, the nozzle which is used to introduce the flo-coating material into the food container can also function as the rotating mandril to achieve the desired internal coating effect.

The fats or blends of fats which can be utilized in the present invention include any food grade fats, either natural or hydrogenated, which are solid at room temperature and provide an effective barrier to moisture penetration and wetting, such as for example, fats having a melting point range of up to about 160° F. Typically, these fats are solid glyceryl esters of higher fatty acids ranging from $C_8$ to $C_{20}$, preferably $C_{12}$ to $C_{18}$. Examples of such acids are caprylic acid, lauric acid, palmitic acid, stearic acid eicosadienoic acid and the like. Suitable food grade fats can be made from rape seed oil, hydrogenated vegetable oil, such as for example cotton seed oil, and the like. The fats of the present invention can also be modified by distillation alone, distillation and acetylation or any other method to produce modified fats which are effective for the purposes of the present invention. Furthermore, fat-containing coating such as chocolate can also be used as the fat coating of the present invention.

Examples of suitable fats include Duratex, which is a food grade powdered lubricant made from hydrogenated cotton seed oil having a capillary melting point of 136° to 144° F.; Myvacet (5-07) which is a fat which has been modified by acetylation to form an acetylated monoglyceride having a melting point of 106° to 115° F.; Myvacet (7-07K) which is also a modified fat having a melting point of 99° to 104° F.; Aratex which is a hydrogenated vegetable fat having a melting point of 115° to 119° F., various emulsifiers such as Span 60 and Tween 60, and the like. The fats can be either hydrophobic of hydrophylic in nature. In the latter case the moisture is picked up by the fat coating but not transmitted to the edible food containers.

The superior moisture resistant properties of edible food containers coated with a fat as defined by the present invention are demonstrated by the following comparative examples.

A leak test was conducted comparing uncoated molded white cake cones (KC3 tart shells), cake cones provided with a candy coating, cake cones flo coated with a single fat coating and cake cones flo coated with a double fat coating. In the leak test tap water at 60° F. was placed into the coated and uncoated cones and the time required for the water to begin to leak through the cone was observed with the following results:

| Type of Coating | Leak Time (min) |
| --- | --- |
| 1. Uncoated | 0.6 |

| Type of Coating | Leak Time (min) |
| --- | --- |
| 2. Candy Coating (mixture of sugar, coloring, flavor & water) | |
| Raspberry | 0.8 |
| Vanilla | 1.6 |
| 3. Single Coating of Fat | |
| Duratex | 26.6 |
| Aratex | 7.2 |
| 4. Double Coating of Fat | |
| Myvacet | 24.5 |
| Duratex | 29.6 |
| Aratex | 17.9 |

In an additional test, after the fat coating was applied, the coated cones were placed in an air convection oven at 140° F. for one hour to simulate an extreme storage or shipping environmental condition. The leak test was again performed with the following results:

| Type of Coating | Leak Time (min) |
| --- | --- |
| 1. Single Coat | |
| Duratex | 16.5 |
| Aratex | 12.9 |
| 2. Double Coat | |
| Myvacet | 18.8 |
| Duratex | 13.8 |
| Aratex | 13.0 |

The above tests show that the fat coating provided a significant barrier to liquid penetration of the edible container.

In the flo coating of the KC3 shells or other edible food containers, the coating operation is advantageously carried out at room temperature utilizing a fat which is heated to a temperature above its melting point. Thus the temperature to which the fat is heated depends upon the particular fat which is utilized as the coating material. The coated containers are generally permitted to slowly cool at ambient temperature, but if a more accelerated solidification and cooling of the fat coating is desired, the coated food containers can be placed in a cooling chamber.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of processing an edible food container for use with a food product which comprises applying a moisture-resistant, barrier coating composition of a food grade fat material to at least the interior surface of the edible food container in an amount sufficient to produce a continuous, uniform film of said barrier coating composition on said surface, said barrier coating composition being applied by introducing an effective amount of said coating composition into the edible food container and then forcing the coating composition up the inside surface of the container by imparting relative motion to the container and coating composition to effect a rotational motion of the coating composition within the container.

2. The method of claim 1 wherein the edible food container is rotated to force the barrier coating composition up the inside surface of the container.

3. The method of claim 1 wherein the barrier coating composition within the container is rotated to force the coating composition up the inside surface of the container.

4. The method of claim 2 or 3 wherein the excess coating composition escapes from the top of the container and is recovered and recycled for reuse.

5. The method of claim 1 wherein the barrier coating composition is heated to the melting point of the fat and the application of the barrier coating composition to the container is conducted at ambient temperature.

6. The method of claim 5 wherein the coated containers are cooled subsequent to the coating operation.

7. The method of claim 1 wherein the food grade fat material includes modified fats and mixtures thereof.

8. The method of claim 7 wherein the food grade fat material is selected from the group consisting of an acetylated monoglyceride having a melting point of 99° to 115° F., a hydrogenated cotton seed oil having a melting point of 136° to 144° F. and a hydrogenated vegetable fat having a melting point of 115° to 119° F.

9. The method of claim 1 wherein the fat material contains a flavor producing additive.

10. The method of claim 9 wherein the flavor is rye, onion or garlic.

11. The method of claim 9 wherein the flavor is orange, lemon, grapefruit, grape, banana, or maple.

12. The method of claim 3, wherein a mandril extends into coating composition disposed within the edible food container and the barrier coating composition within the container is rotated by the rotation of the mandril to force the coating composition up the inside surface of the container.

13. An edible food container produced by the process of claim 1, said edible food container being provided with a moisture resistant barrier coating composition having a substantially uniform thickness on at least the internal surface thereof, said coating composition comprising a food grade fat, food grade modified fats or mixtures thereof.

* * * * *